United States Patent [19]

Bauer et al.

[11] Patent Number: 4,723,101
[45] Date of Patent: Feb. 2, 1988

[54] WINDSHIELD WIPER SYSTEM

[75] Inventors: Kurt Bauer, Ingersheim; Oldrich Krizek; Hans Prohaska, both of Bietigheim-Bissingen; Eckhardt Schmid, Brackenheim, all of Fed. Rep. of Germany

[73] Assignee: SWF Auto-Electric GmbH, Bietigheim-Bissingen, Fed. Rep. of Germany

[21] Appl. No.: 850,841

[22] Filed: Apr. 11, 1986

[30] Foreign Application Priority Data

Apr. 11, 1985 [DE] Fed. Rep. of Germany ....... 3512941

[51] Int. Cl.⁴ .............................................. B60S 1/08
[52] U.S. Cl. .................................... 318/443; 318/282; 318/DIG. 2; 15/250.13; 15/250.17
[58] Field of Search ............... 318/280, 281, 282, 283, 318/443, 444, 445, DIG. 2; 15/250 C, 250.12, 250.13, 250.16, 250.17, 250.14, 250.21

[56] References Cited

U.S. PATENT DOCUMENTS

| | | | |
|---|---|---|---|
| 4,405,887 | 9/1983 | Tamura et al. | 318/443 |
| 4,431,954 | 2/1984 | Carpenter et al. | 15/250.13 X |
| 4,454,626 | 6/1984 | Schmidt et al. | 15/250.16 |
| 4,585,980 | 4/1986 | Gille et al. | 318/DIG. 2 X |
| 4,614,903 | 9/1986 | Betsch et al. | 319/DIG. 2 X |
| 4,665,488 | 5/1987 | Graham et al. | 318/DIG. 2 X |
| 4,670,695 | 6/1987 | Licata et al. | 318/443 |

*Primary Examiner*—Bentsu Ro
*Attorney, Agent, or Firm*—James B. Raden; Robert P. Seitter

[57] ABSTRACT

A windshield wiper system includes two windshield wipers of which each is mounted on a separate wiper shaft and may be driven to and fro by a separate motor between an inner reversing position and an outer reversing position, which windshield wipers are at least partially superposed in their inner reversing position and rotate in opposite directions through one wiping cycle. The two windshield wipers are moved without collision even though they wipe an overlapping area. The first windshield wiper is driven by its associated motor with a greater angular velocity of the output shaft than the second windshield wiper is driven by its motor. In addition the first windshield wiper is stopped for a predetermined time in its inner reversing position between two wiping cycles.

23 Claims, 11 Drawing Figures

WINDSHIELD WIPER SYSTEM

BACKGROUND OF THE INVENTION

The invention pertains to a windshield wiper system.

German specification AS No. 2 102 033 shows a windshield wiper system for motor vehicles, in which two windshield wipers, each mounted on a separate wiper shaft, can be driven to and fro between an inner reversing position and an outer reversing position by a common motor. The two windshield wipers run through one wiping cycle in opposite directions. In their outer reversing position the two wipers lie in opposite corners of the window pane to be cleaned approximately parallel to the bottom rim. The two wipers have wiping areas which overlap in the center of the window pane, so that there is a common wiping area. Collision of the two windshield wipers in the common wiping area must be prevented. To achieve this, each windshield wiper is driven via a crossed crank-rocker mechanism which consists of a motor crank, a rocker arm firmly connected with the wiper shaft and coupling rod. The coupling rod is articulated both onto the motor crank and onto the rocker arm. The two crossed crank-rocker mechanisms are arranged such that for one windshield wiper the forward motion is more rapid than the return motion and for the other windshield wiper the return motion is faster than the forward motion. This provides that one windshield wiper reaches the common wiping area only after the other has already left it.

In a windshield wiper system according to the German specification DE-AS No. 1 268 505 two windshield wipers are also driven by one motor in opposite directions between an inner and an outer reversing position. The two windshield wipers lie parallel to each other and to the bottom rim of the window pane in their inner reversing position. In this position they overlap in their longitudinal direction for a certain distance, so that a substantially triangular common wiping area is provided in which collision of the two windshield wipers must be prevented. The gearing members are therefore used such that upon leaving the inner reversing position the upper or first windshield wiper is at first driven more rapidly than the lower or second one, but then the first one becomes slower and the second one faster, so that both windshield wipers reach their outer reversing positions at the same time. In the return run the second windshield wiper is at first driven faster than the first one. However both windshield wipers reach the inner reversing position at the same time again, because during the return run the first windshield wiper is subsequently driven faster than the second one. In a windshield wiper system of this kind only a small common wiping area for the two wipers is possible, so that in the center of the window pane a large wedge-shaped section is left which is not wiped at all.

A so-called double windshield wiper system is also known with two windshield wipers and two motors, of which each one drives one windshield wiper. There is also a common wiping area in this windshield wiper system. However, the two windshield wipers are moved in the same direction.

SUMMARY OF THE INVENTION

It is one object of the present invention to provide a windshield wiper system with two windshield wipers and two motors such that the two windshield wipers can substantially overlap in the center of the window pane to be cleaned and can nevertheless be operated reliably without collisions. Thereby the two windshield wipers are intended to carry out movements as uniform as possible.

According to the invention this object is solved in that the first windshield wiper is driven by its associated motor with a greater angular velocity of the output shaft than the second windshield wiper is driven by its motor and that the first windshield wiper is stopped in its inner reversing position between two wiping cycles for a time period.

Thus in a windshield wiper system according to the invention the first windshield wiper is in one wiping cycle started at a later time than the second windshield wiper. The delay of the first windshield wiper is made long enough so that, in spite of its higher velocity after its start, it cannot reach the second windshield wiper within the large common wiping area. The velocity and the delay time of the first windshield wiper can be adapted to each other in such a way that under normal conditions the two windshield wipers reach the outer reversing position at the same time. The first windshield wiper is also faster than the second windshield wiper in the return motion, so that it reaches the common wiping area before the second windshield wiper and the two windshield wipers can move to their inner reversing position without collision. Thus under normal conditions the two windshield wipers work in opposite directions. The output shaft can rotate and carry a crank, so that the motors, too, must only rotate in one direction.

In principle it is possible to determine a certain time between the start of the second windshield wiper from the inner reversing position and the start of the first windshield wiper from this reversing position. However, different wiping conditions are not considered thereby. Therefore in a preferred embodiment the first windshield wiper is started, when the second one has moved over a defined distance.

In accordance with one aspect of invention, collision of the two windshield wipers in the forward motion is prevented with a high probability, because the first windshield wiper only moves across the common wiping area or part of the common wiping area after the second windshield wiper has reached or moved across a position outside the common wiping area.

In order to increase the uniformity of the courses of motion of the two windshield wipers, the predetermined position which the second wiper crosses when the first windshield wiper starts, lies inside the common wiping area. Therefore, the first wiper is stopped for a shorter time. To prevent collision of the two windshield wipers in the forward motion with complete certainty, it is advantageous if the first windshield wiper is stopped at a predetermined position inside the common wiping area away from its reversing position, when the second windshield wiper in its forward motion has not yet moved across a predetermined position lying outside the common wiping area. The predetermined position of the first windshield wiper is advantageously chosen such that a collision is prevented even, if the second windshield wiper has stopped at the position it moves across to end the stoppage of the first windshield wiper.

Thus outside the common wiping area there is a predetermined or marked position for the second windshield wiper. When the first windshield wiper has crossed this position in forward motion the second wiper can leave the common wiping area. In the return motion the motor of the second windshield wiper is switched off when the second wiper crosses a predetermined position and the first windshield wiper has not yet crossed a defined position inside the common wiping area. It is of a particular advantage if these two marked positions of the second windshield wiper are spaced from each other, so that on the one hand it is ensured that, after switching-off, the first windshield wiper does not enter the common wiping area even though there is an after-running of its motor, but on the other hand the entire common wiping area is immediately unblocked for the first windshield wiper in the forward motion, when the second windshield wiper has left the common wiping area in the forward motion.

The longer the first windshield wiper is stopped in the inner reversing position and the greater the difference of the angular velocities of the two windshield wipers, the more non-uniform are the wiping movements of the two windshield wipers in comparison with each other. Not only must the first windshield wiper start later from the inner reversing position than the second windshield wiper, but also that in the return motion it must arrive there earlier. Therefore, during normal wiper operation, the first windshield wiper is stopped between two wiping cycles for approximately twice the time between the start of the two windshield wipers from the inner reversing position. To shorten the stop of the first windshield wiper and to reduce the difference of the two running times in a wiping cycle with forward and return motion, means are provided for one windshield wiper by which a uniform rotation of the output shaft or of a motor crank fixed on the former can be converted into a non-uniform motion of the windshield wiper of the kind that forward and return motion differ with regard to their duration. Thus with a constant revolutional speed of the motor crank the forward motion is advantageously slower than the return motion. The forward motion of the second windshield wiper is advantageously made faster than its return motion. The different times for forward and return motion of a windshield wiper are in a simple manner achieved in that the windshield wiper may be driven via a crossed crank-rocker mechanism.

Nowadays it is often desired that the windshield wipers are deposited in a parking position when the windshield wiper system is not operated, which parking position is submerged in comparison with an adjacent reversing position. The angle between the adjacent reversing position and the parking position is designated angle of deposit. In a windshield wiper system with two windshield wipers moving in opposite directions, which are superposed in their inner reversing position, the angle of deposit of one windshield wiper is preferable made larger than that of the other windshield wiper. It is thereby made use of the fact that the angular distance between the two windshield wipers can be smaller the closer the two windshield wipers are brought into a position parallel to each other. They can occupy such a position relative to each other in the parking position.

Even if the start of the first windshield wiper from the inner reversing position is delayed by a predetermined time after the start of the second windshield wiper and this delay is sufficient to prevent a collision of the two windshield wipers when these wipers move to and fro between their two reversing positions, under certain circumstances this delay time is not sufficient to prevent a collision when the two windshield wipers start from their parking positions. On the other hand, if the delay time is made so long that a collision is prevented when starting from the parking position the time between two wiping cycles is unnecessarily long.

This problem can be solved in accordance with yet another aspect of the invention wherein a motor crank driving a windshield wiper occupies a different position in the parking position of this windshield wiper from that of the inner reversing position of the windshield wiper. Thus in the parking position of the two windshield wipers a spacing between the angular positions of the two motor cranks is achieved such that, when the first windshield wiper is started, the second windshield wiper has been swivelled about an angle which is larger than the delay time indicates.

Advantageously the inner reversing position and the parking position of a windshield wiper are marked by a sensor. By marking the parking position the motor can be switched off automatically there. The marking of the inner reversing position is of advantage for the mutual control of the two windshield wipers and necessary for the intermittent operation of the windshield wiper system, when the interval times of the intermittent operation the two windshield wipers shall occupy the inner reversing position.

BRIEF DESCRIPTION OF THE DRAWING

The invention will be better understood from a reading of the following detailed description in conjunction with the drawing in which.

DETAILED DESCRIPTION

Figure 1:
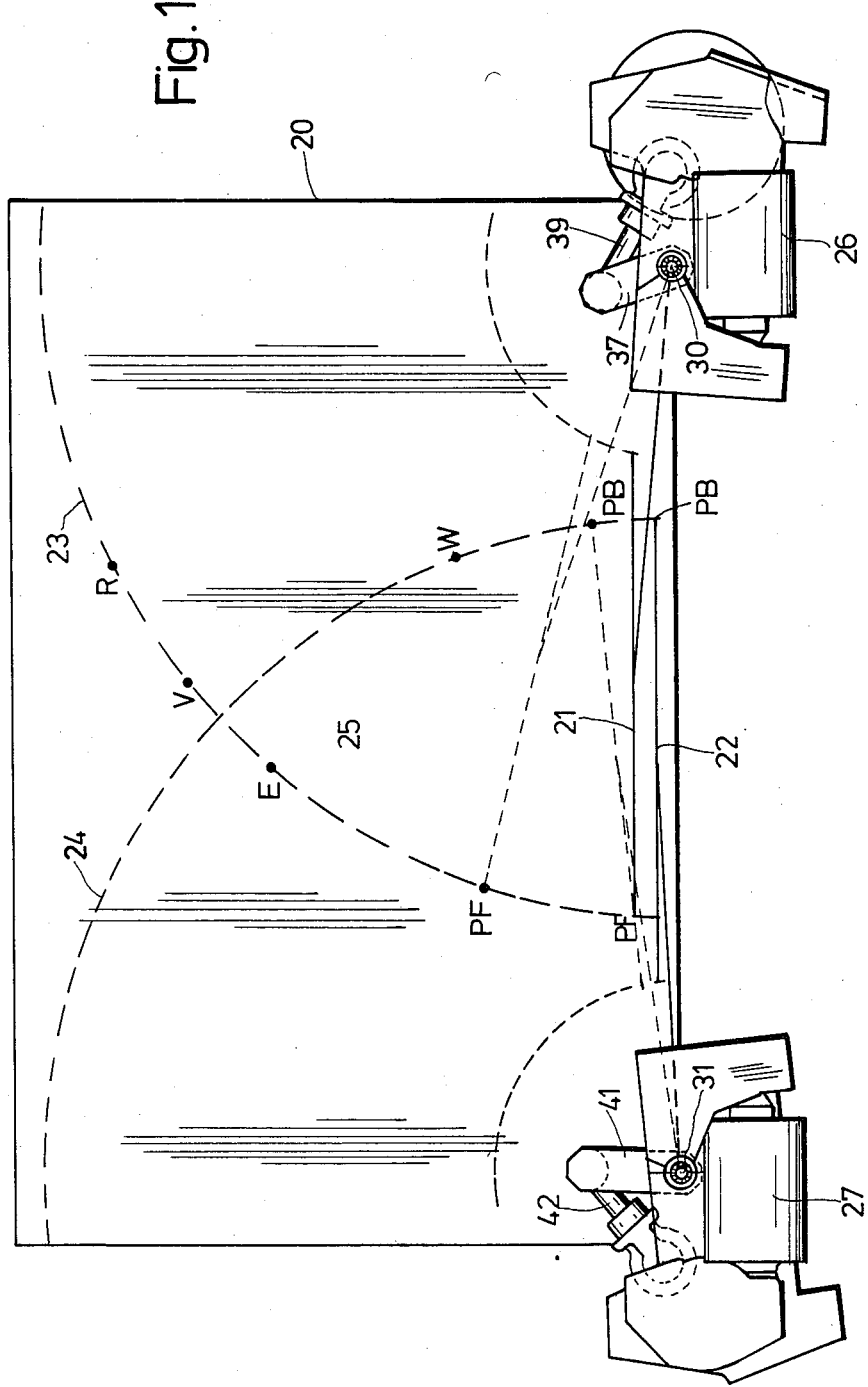
FIG. 1 illustrates a first embodiment mounted in the vicinity of the windshield of a motor vehicle, wherein the drive units are shown at an enlarged scale in comparison with the windshield.

In FIG. 1 windshield 20 can be cleaned by two windshield wipers 21 and 22. As shown in FIG. 1 these windshield wipers occupy the so-called submerged parking position, in which they lie approximately parallel to each other and to the bottom rim of the window pane 20 in the vicinity of this rim and approximately in the center of the windshield 20. They overlap over the major part of their length. The wiping area 23 or 24 of each of the two windshield wipers is indicated by broken lines. It can be seen that a large central section 25 of the windshield 20 is moved across by both windshield wipers and is a common wiping area of the two windshield wipers.

When operated, each of the two windshield wipers 21 and 22 after having left its parking position in a first wiping cycle is moved to and fro between an inner reversing position adjacent to the parking position and a reversing position in which it lies substantially parallel to a lateral rim of the windshield 20. The windshield wiper 21 which cleans the half of the windshield 20 located at the driver's side is driven by an electric motor 26. The other windshield wiper 22 which cleans the half of the windshield 20 located at the passenger side is driven by an electric motor 27.

Figure 2:
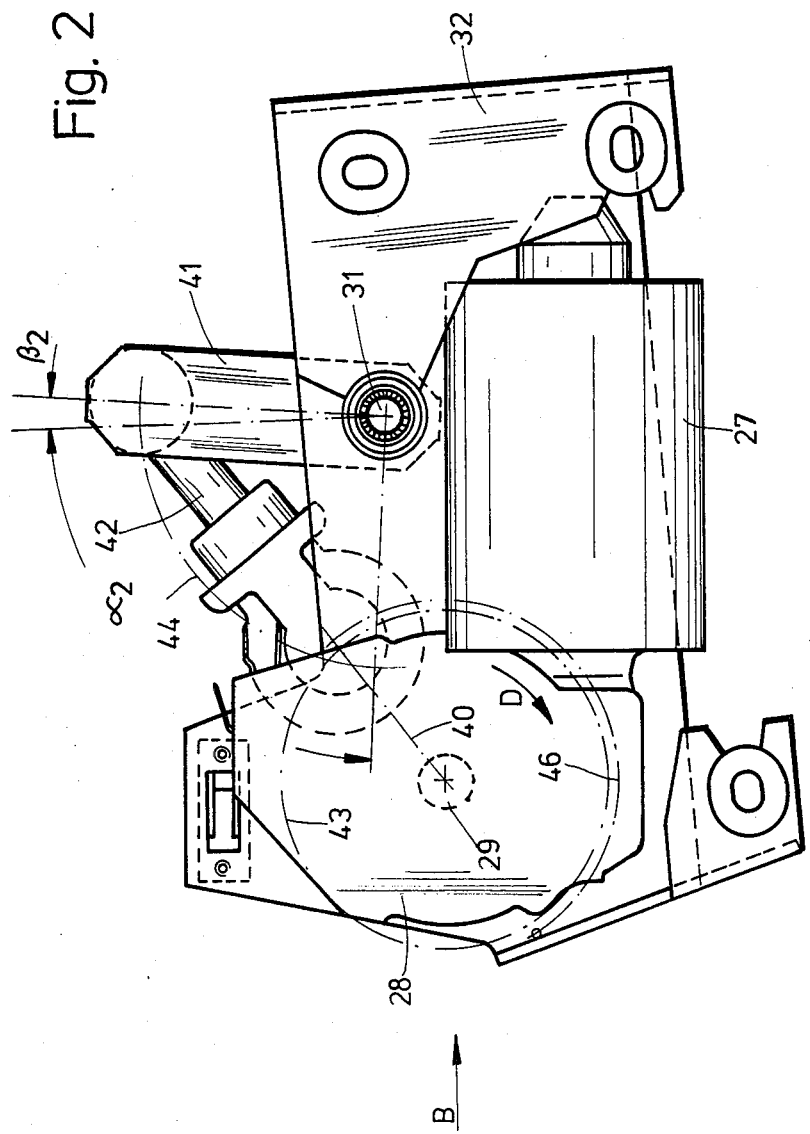
FIG. 2 shows the drive unit at the passenger side in the same view as in FIG. 1, however at an enlarged scale.
Figure 3:
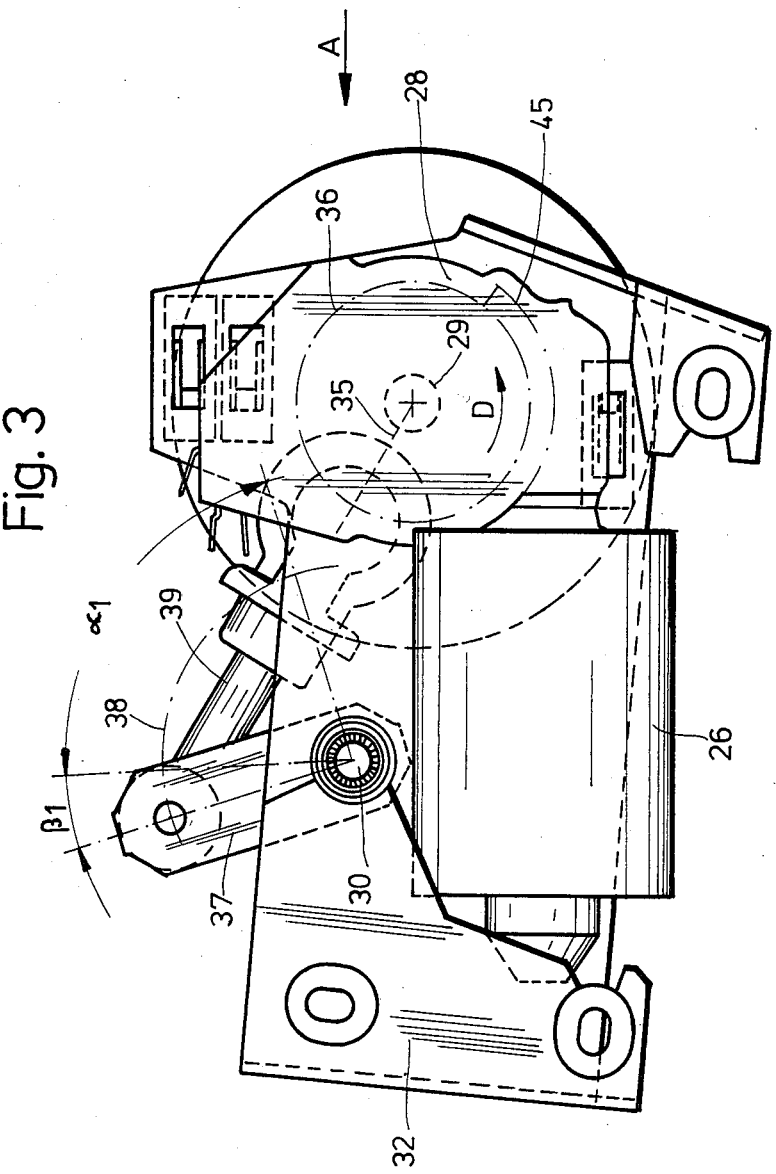
FIG. 3 shows the drive unit at the drivers side.

In the top views of electric motor 27 in FIG. 2 and of electric motor 26 in FIG. 3 each one of the electric motors has a reduction gearing accomodated in a gear housing 28 and an output shaft 29 projecting from the gear housing 28. The output shaft 29 rotates with a fixed direction of rotation during normal wiper operation. As seen in FIG. 3, the rotation of the output shaft 29 of an electric motor 26 is converted into a to-and-fro movement of the wiper shaft 30 via a crank-rocker mechanism, on which wiper shaft the windshield wiper 21 is fixed in a manner protected against twisting.

The rotation of the output shaft 29 of the electric motor 27 is also converted into a to-and-fro movement of the wiper shaft 31 via a crank mechanism shown in FIG. 2 on which wiper shaft the windshield wiper 22 is fixed in a manner protected against twisting. Each electric motor 26 and 27 with its associated wiper shaft 30 or 31 is arranged on a sheet metal mount 32, by means of which the drive unit consisting of electric motor, crank-rocker mechanism and wiper shaft can be screwed onto the body of a motor vehicle.

Output shaft 29 of the electric motor 26 rotates a motor crank 35, whose length during normal wiper operation corresponds to the radius of the circle 36 shown with a dash-dotted line in FIG. 3. Rocker arm 37 is secured on the wiper shaft 30 and its length corresponds to the radius of the dash-dotted circle line 38. A coupling rod 39, to which the motor crank 35 and the rocker arm 37 are articulated, interconnects these two members of the crank-rocker mechanism.

The crank-rocker mechanism between the output shaft 29 of the electric motor 27 and the wiper shaft 31 is constructed in the same way as the crank-rocker mechanism between the output shaft 29 of the electric motor 29 and the wiper shaft 30. However the various crank-rocker-mechanism members, motor crank 40, rocker arm 41 and coupling rod 42 are not as long as the corresponding motor crank 35, rocker arm 37 and coupling rod 39. During normal wiper operation the length of the motor crank 40 corresponds to the radius of the circle 43 shown with a dash-dotted line. The length of the rocker arm 41 corresponds to the radius of the circle line 44.

In FIGS. 1, 2 and 3 the rocker arms 37 and 41 occupy positions which correspond to the submerged parking positions of the windshield wipers 21 and 22. In this position the motor crank 35 is longer than during normal wiper operation by a length e (see FIG. 6), which is as large as the difference between the radii of the circle 36 and the graduated circle 45 also shown in FIG. 3. The motor crank 40 is also longer than during normal wiper opertion by a length e, which corresponds to the difference to the radii of the circle 43 and the graduated circle 46 shown in FIG. 2. The added lengths make it possible for the windshield wipers 21 and 22 to enter into parking positions which are submerged by angle $\beta 1$ or $\beta 2$, when the windshield wiper system is switched off.

The change in the lengths of motor cranks 35 and 40 and coupling rod 39 and 42 is achieved in that before the last wiping cycle the direction of rotation of the electric motors 26 and 27 is reversed in the inner reversing position of the windshield wipers 21 and 22 and that the joint between the motor cranks 35 and 40 and the coupling rods 39 and 42 is developed in a special manner. The principle of the construction of this joint and its mode of operation can be seen from FIG. 6 in connection with a change of the direction of rotation of the electric motor. More details of the design of a joint of this kind can be seen from co-pending U.S. application Ser. No. 617,719 filed June 6, 1984 for Windshield Wiper Crank Gear by one of the co-inventors of this application, Eckhardt Schmid, and others. This co-pending U.S. application corresponds to the German specification OS No. 3,320,773.

Figure 6:
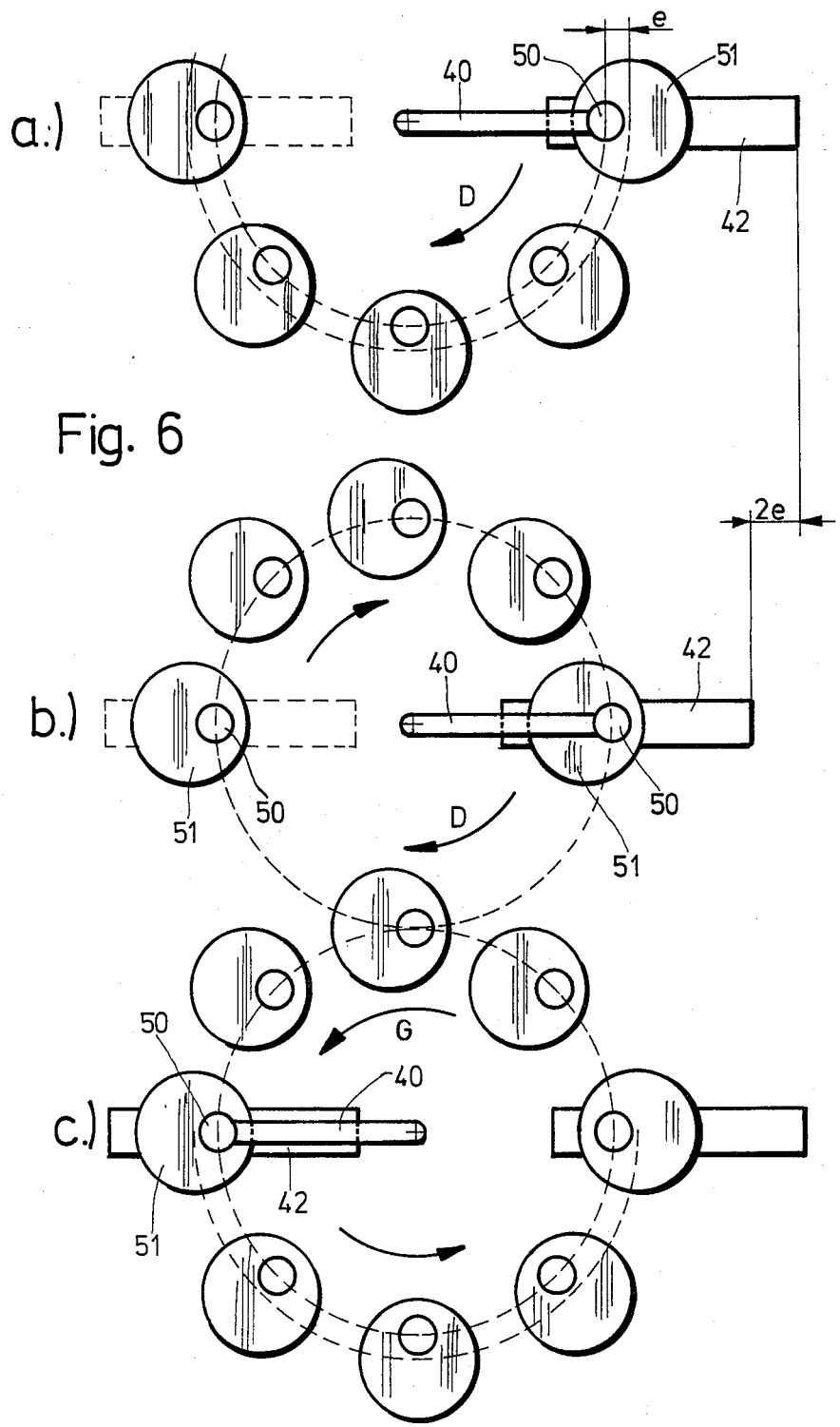
FIG. 6 shows diagrammatic views illustrating the necessary changes in the length of the motor crank and of the coupling rod for depositing the windshield wipers in a submerged parking position.

In FIG. 6 a pin 50 is fixed on a motor crank. A universal ball joint 51 is eccentrically fitted on pin 50. The center axis of ball joint 51 is set off relative to the center axis of the pin 50 by a distance e. A coupling rod 42 overlaps the universal ball joint 51 with a spherical cap. In the parking position of the associated windshield wiper the coupling rod 42 occupies the position shown in FIG. 6a with unbroken lines. When the system is switched on the electric motor begins to rotate its motor crank in the direction of arrow D. Up to the outer reversing position on the universal ball joint 51 is coupled with the pin 50 in a manner protected against twisting, while the coupling rod 42 with its spherical cap turns relative to the universal ball joint 51. Thus up to this point the axis of the universal ball joint 51 forms the axis of the joint between motor crank and coupling rod 42. The effective length of the motor crank corresponds to the distance between the axis of the universal ball joint 51 from the center of the circle on which it moves. The length of the coupling rod corresponds to the distance between the axis of the universal ball joint 51 from the right-hand end of the coupling rod 42 in FIG. 6.

In the outer reversing position the firm connection between the pin 50 and the universal ball joint 51 is released and the latter is firmly connected with the coupling rod 42, so that during the following operation pin 50 and universal ball joint 51 are twisted relative to each other. The effective length of the motor crank now corresponds to the distance between the axis of the pin 50 and the right-hand end of the coupling rod. Both the crank 40 and the coupling rod 42 are now shortened by a distance e, so that in the position of the coupling rod 42 shown in FIG. 6b with unbroken lines the right-hand end of this coupling rod is retracted by a distance 2e as compared with FIG. 6a. The rocker arm 41, therefore, moves no longer across the angle $\beta 2$ (FIG. 2). Now the windshield wiper 22 only moves between the outer and the inner reversing positions.

If the windshield wiper system is now switched off, the direction of rotation of the electric motor is reversed as soon as the crank 40 and the coupling rod 42 occupy the positions shown with unbroken lines in FIG. 6b, thus the windshield wiper 22 is in its inner reversing position. The motor crank now rotates in the direction of arrow G of FIG. 6c. In the outer reversing position of the windshield wiper the universal ball joint 51 is again firmly coupled with the pin 50 because of the reversed direction of rotation of the motor crank 40. Crank 40 and the coupling rod 42 are both elongated by distance e, because now the axis of the universal ball joint 51 is the axis of the joint between crank 40 and coupling rod 42. In the return motion the rocker arm 41 is swivelled farther than during normal wiper operation, so that the windshield wiper 22 enters the submerged parking position. The system is stopped there.

The angle between the inner reversing position and the parking position of one windshield wiper can be easily laid out differently from the corresponding angle of the other windshield wiper in that for the two drive units different distances e are chosen. As FIG. 1 shows, it is thus possible to deposit the two windshield wipers 21 and 22 very closely beside each other.

Figure 4:
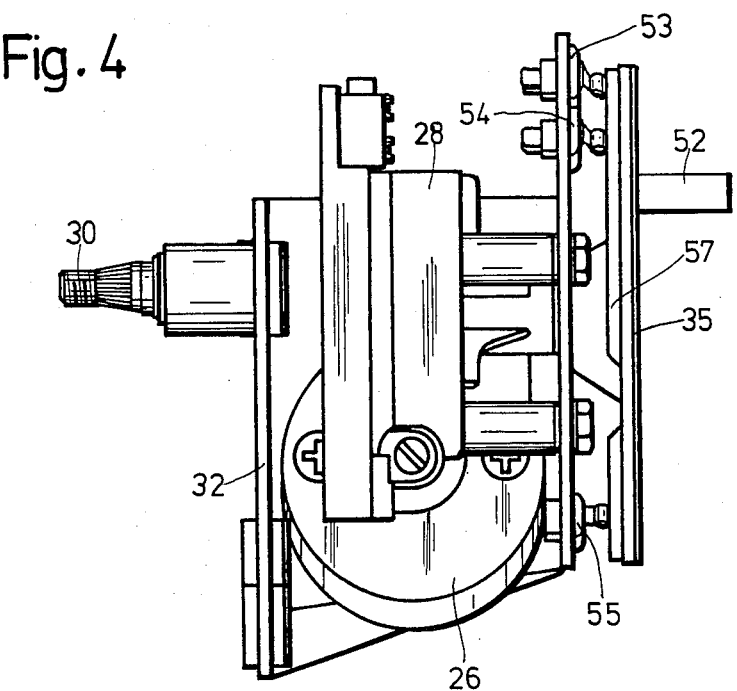
FIG. 4 is a view of the drive unit of FIG. 3 in the direction of arrow A.
Figure 5:
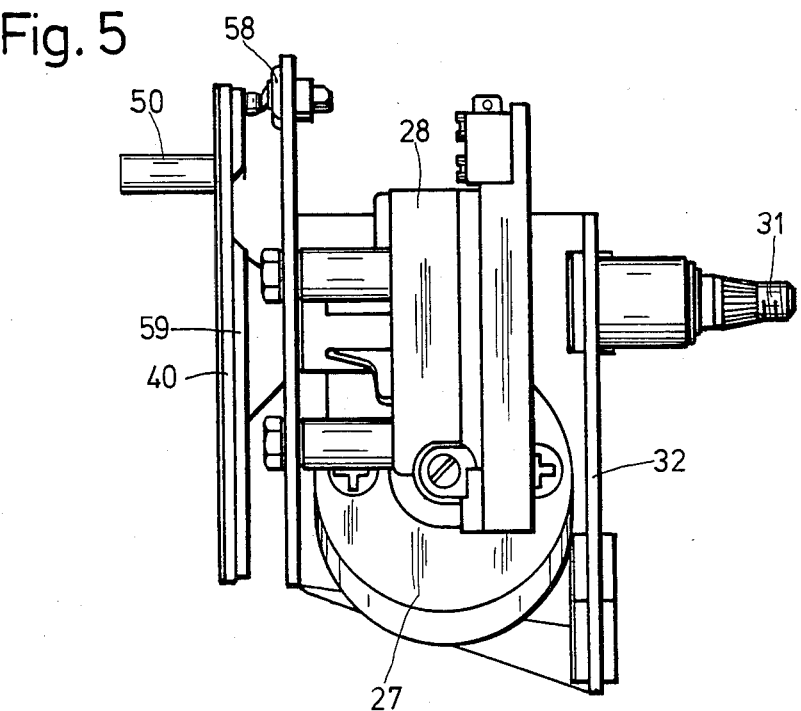
FIG. 5 is a view of the drive unit of FIG. 2 in the direction of arrow B.
Figure 7:
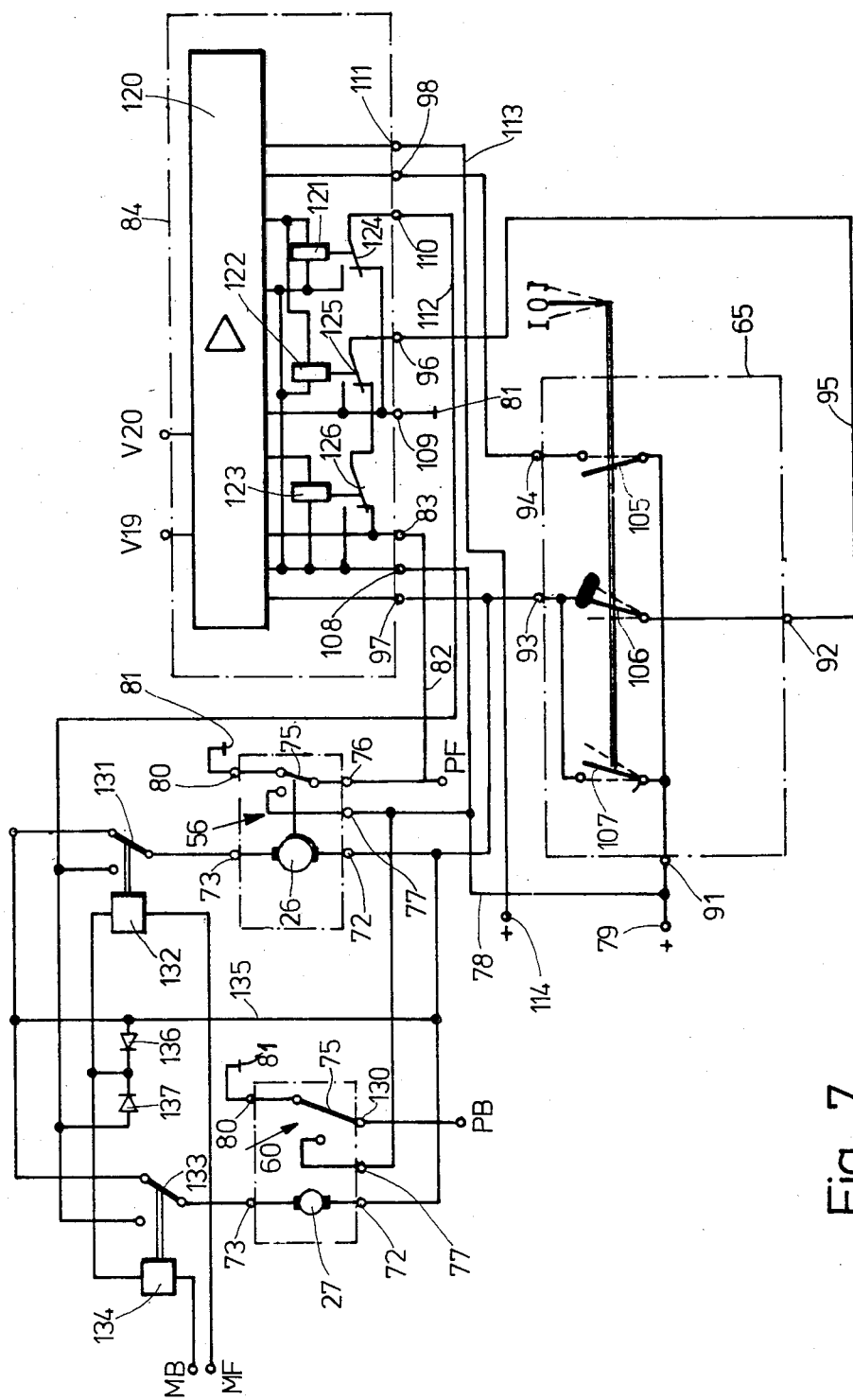
FIG. 7 is an electric circuit arrangement for a current supply of the two electric motors in intermittent and continuous operation.

As FIGS. 2 to 5 in particular show the motor cranks 35 and 40 are formed by circular discs, of which one carries the pin 50 and the other a pin 52. The positions E, V, R and PF of the windshield wiper 21 in FIG. 1 are marked by sensors formed by electric switches 53, 54, 55 and a parking position switch 56, which can be seen from FIG. 7. The switches 53 to 55 are mounted on the sheet metal mount 32 as best seen in FIGS. 4 and 7 and are actuated by cam disc 57 rotating with the motor crank 35. A parking position switch 56 shown in FIG. 7 is positioned in the gear housing and marks both the inner reversing position and the parking position of the windshield wiper 21. As shown in FIG. 1, for the windshield wiper 22 only a position PB and a position W are marked. An electric switch 58 shown in FIGS. 5 and 7 serves for marking the position W, is mounted on the sheet metal mount 32 and can be actuated by a cam disc 59, which rotates with the crank 40. The other position is again marked by a parking position switch, which is located in the gear housing 28 of the electric motor 27 and is actuated both in the inner reversing position and in the parking position of the windshield wiper 22, because the gearing members occupy at least substantially the same positions in these two positions.

Figure 8:
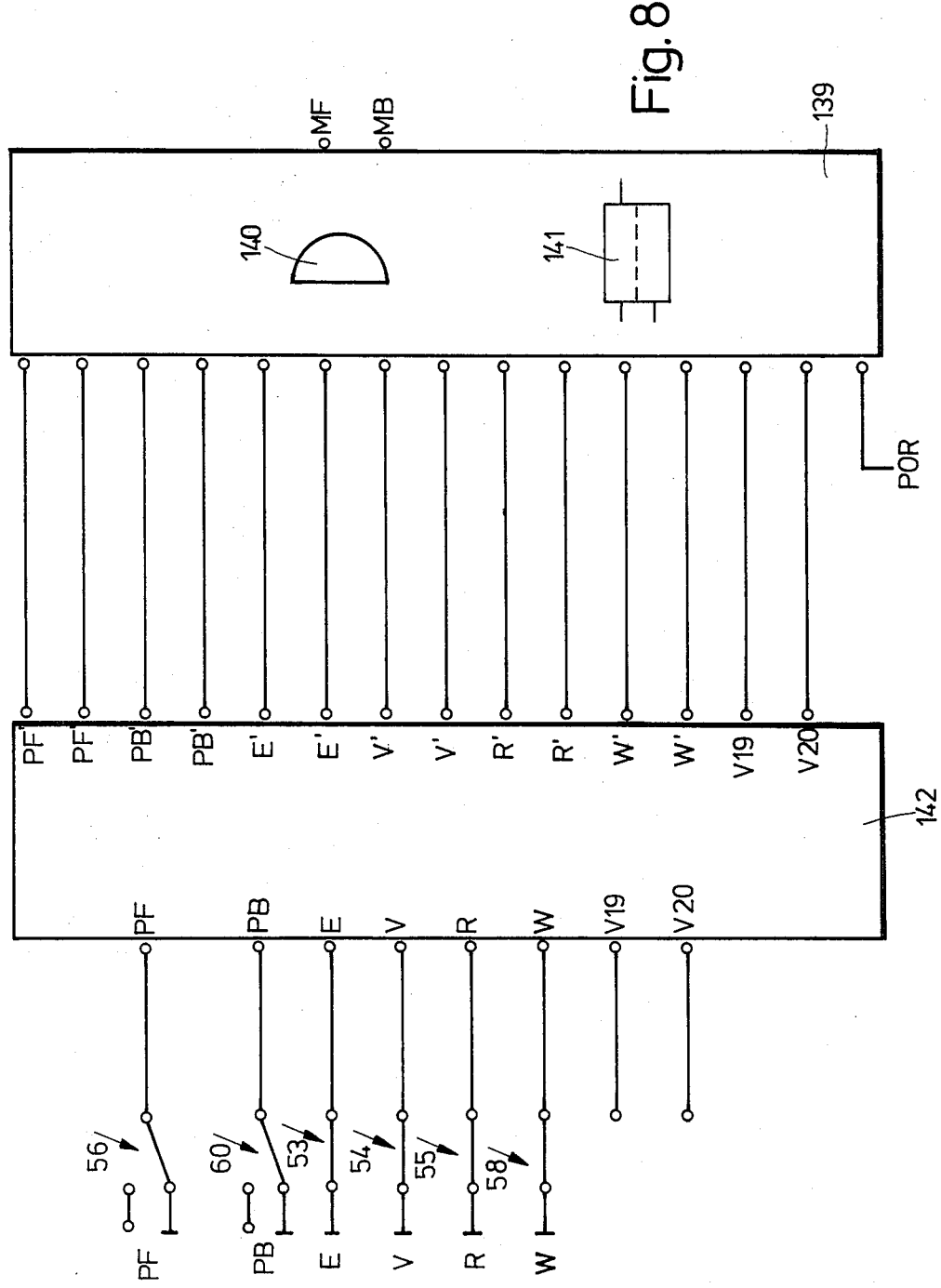
FIG. 8 is an electric circuit arrangement for a control of the current supply for the two electric motors of FIG. 7 in dependence on the relative position of the two windshield wipers relative to each other.

The marking of the mentioned positions of the windshield wipers 21 and 22 serves to control the two electric motors 26 and 27 in dependence on the relative position of the two windshield wipers 21 and 22 to each other and thereby to prevent a collision of the two windshield wipers. The two associated electric circuit arrangements of FIGS. 7 and 8 are arranged such that the control of the two electric motors 26 and 27 is effected in dependence on the positions of the windshield wipers 21 and 22 as follows:

When the system is switched on by operating switch 65 in FIG. 7 initially only motor 26 is switched on the windshield wiper 21 leaves its parking position. When position E shown in FIG. 1 is crossed by wiper 21, electric motor 27 is also switched on. Electric motor 27 is wound in such a way that it has a higher revolutional speed than the electric motor 26. Motor 27 drives windshield wiper 22 from its parking position. When windshield wiper 22 reaches position W sooner before windshield wiper 21 reaches the position V, windshield wiper 22 is stopped at position W until the associated electric switch 54 has detected position V of windshield wiper 21. At that time windshield wiper 21 has left the common wiping area 25 and windshield wiper 22 can swivel to an outer reversing position without colliding with wiper 21. This forward motion is followed without interruption by the return motion of the windshield wiper 22. Due to its higher wiping speed, wiper 22 overtakes windshield wiper 21, whose electric motor 26 is switched off at position R if windshield wiper insofar has reached position R sooner than windshield wiper 22 reaches position W. After crossing the position W the windshield wiper 22 reaches its inner reversing position shown in FIG. 1 by broken lines, in which position electric motor 27 is switched off upon a signal of the parking position switch 60. A signal from the parking position switch 60 makes it also possible for electric motor 26 to drive wiper 21 beyond position E into its inner reversing position. After windshield wiper 22 has crosses position W, but has not yet reached the inner reversing position, electric motor 26 of windshield wiper 21 is switched off at the position E. Between two wiping cycles the windshield wiper 22 is stopped from the moment it has reached its inner reversing position to the moment the windshield wiper 21 again crosses position E in a forward motion directly following its return motion.

At position E of windshield wiper 21 as well as at position W and at the inner reversing position of windshield wiper 22 a signal for the control of the other windshield wiper is given and switching-off of the respective electric motor is possible. In contrast, at position V only a control signal can be released and at the position R only a switching-off of the electric motor 26 is possible. This has the advantage that position V can be close to the common wiping area. By switching-off the electric motor 26 at position R which is farther away from the common wiping area it is ensured that after-running of the electric motor after its switching-off does not result in windshield wiper 21 still reaching the common wiping area.

The two positions of the rocker arm 41, which the latter occupies in the inner and outer reversing position of the windshield wiper 22, are shown with dash-dotted lines in FIG. 2 and are spaced by the normal wiping angle $\alpha 2$. The axis of the crank 40 and thus of the output shaft is spaced from a straight line which is defined by the two end positions of the axle which has the joint between the coupling rod 42 and the rocker arm 41 and which moves on the arc 44 of a circle. A crank-rocker mechanism of this kind is designated a "crossed crank-rocker mechanism." In such a crossed crank-rocker mechanism the two positions which the crank occupies in the two end positions of the rocker arm 41 are not diametrically opposite each other, thus, when the crank rotates uniformly the time the rocker arm swivels in one direction is shorter than the time for swivelling it in the other direction. When the rocker arm is swivelled in one direction the crank is turned less than 180 degrees and when it is swivelled in the other direction the crank is turned more than 180 degrees. The use of a crossed crank-rocker mechanism with the members motor crank 40, coupling rod 42 and rocker arm 41 has the result that, considering the direction of rotation D, the forward motion of the windshield wiper 22 is slower than the return motion. Because of the slower forward motion, the windshield wiper 22 can be started sooner. In spite of its earlier start it cannot collide with windshield wiper 21 within the common wiping area. The earlier start of the windshield wiper 22 makes it possible to move it with a smaller angular velocity and thus to improve the uniformity of the run of the two windshield wipers 21 and 22 relative to each other. A crossed crank-rocker mechanism can also be used for driving the windshield wiper 21, and the direction of rotation of the electric motor is chosen in such a way that the forward motion of the windshield wiper 21 is shorter than the return motion.

The use of crossed crank-rocker mechanisms is of great advantage if the same direction of rotation of the electric motors is always retained, thus when there is either no submerged parking position available or the submerged parking position is achieved differently without a reversal of the direction of rotation of the electric motors. For a windshield wiper system without a parking position only a firm articulated axle between the coupling rod and the motor crank of the crank-rocker mechanism is used, it must be taken into consideration that, for example, in the windshield wiper system of FIG. 1 the windshield wipers 21 and 22 are in the positions shown in broken lines, when the system is switched off. A crossed crank-rocker mechanism is also of advantage, when the windshield wipers can be brought into a submerged parking position by a reversal of the direction of rotation of the motors, because many rotations of the crank in one direction are opposed by only one rotation in the other direction.

Figure 9:
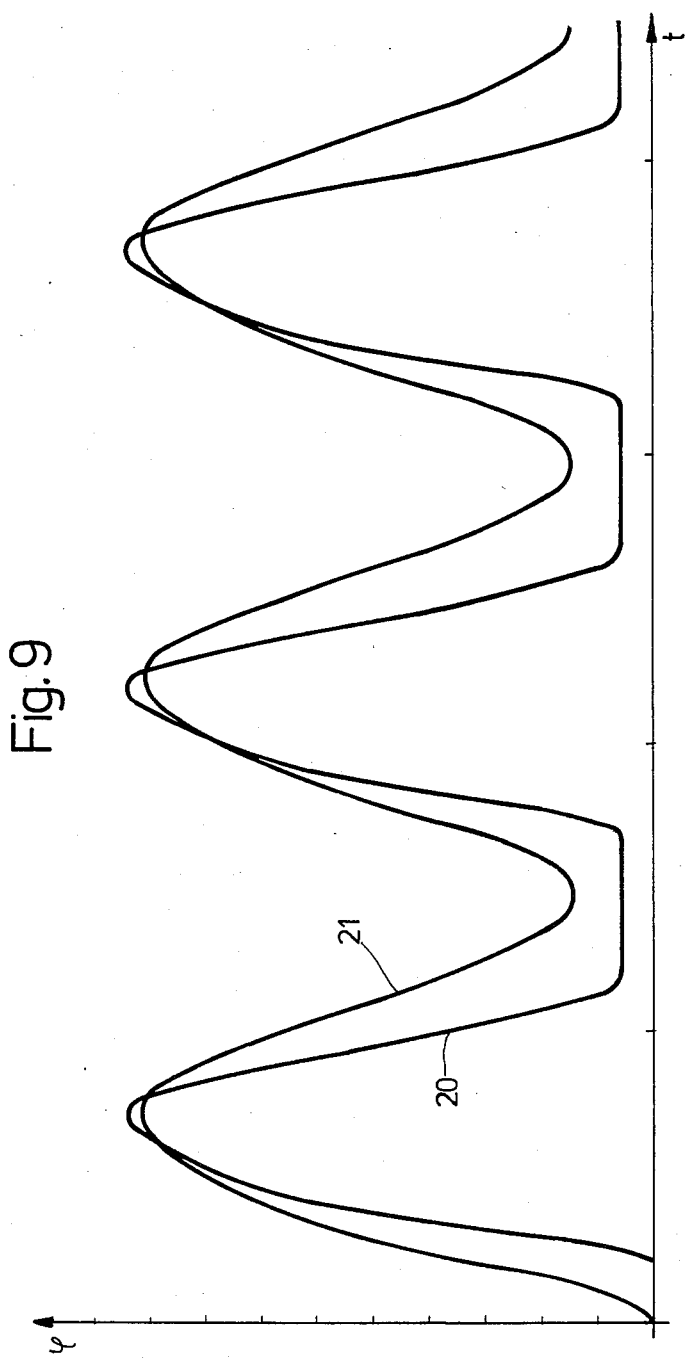
FIG. 9 is a graphic representation of the time dependence of the wiping angle of the two windshield wipers over several wiping cycles.

In FIG. 9, curves 210 and 220 respectively show the angular positions of wipers 21 and 22 relative to time. Starting from the parking position of the two windshield wipers 21 and 22 angle φ which a windshield wiper occupies is shown in relation to the time t. Under normal conditions the windshield wiper 21 moves through its wiping cycles without any stops. Windshield wiper 22 starts later in each wiping cycle than the windshield wiper 21. Wiper 22 returns earlier into its inner reversing position and is stopped for a time interval until the next wiping cycle begins.

As shown in FIG. 7 electric motor 26 is connected to battery via terminals 72 and 73. Associated with motor 26 is a parking position switch 56, which is formed as a two-way switch. The movable contact 75 of the parking position 56 is permanently connected with the terminal 76. It is alternately connected with terminal 77, which via a lead 78 and an output 79 of an ignition switch is connected with the positive battery terminal or with the terminal 80 which is applied to the negative pole 81 of the battery or voltage source. From terminal 76 a lead is conducted to a terminal 83 of a control device 84.

The operating switch 65 can occupy three different switching positions and be manually operated. It has a total of four external connections 91, 92, 93 and 94. The external connection 91 is connected with the output 79 of the ignition switch. From the connection 92 a lead 95 is conducted to a terminal 96 of the control device 84. The connection 93 of the operating switch 65 is connected with terminal 72 of electric motor 26 and with a terminal 97 of control device 84. Terminal 94 of the operating switch 65 is connected with terminal 98 of control device 84.

The operating switch 65 has three bridging contacts 105, 106, and 107, which when the operating switch 65 is changed over, are moved from a central zero position into a continuous operation position and an intermittent operation position. In the zero position and in the intermittent operation position the bridging contact 106 interconnects the two terminals 92 and 93. In the continuous operation position positive potential is supplied from the terminal 91 to the terminal 93 via the bridging contact 107. In the intermittent operation position the bridging contact 105 supplies positive potential from the terminal 91 to the terminal 94.

Control device 84 has four further terminals 108, 109, 110 and 111, of which the terminal 108 is connected with the output 79 of the ignition switch via the lead 78, terminal 109 is connected with the negative pole and terminal 111 is connected directly with the positive pole of the voltage source via a lead 113. Terminal 110 is connectable with the terminal 73 of the electric motor 26 via lead 112.

Control device 84 in addition to an electronic unit 120 includes three relays 121, 122 and 123 whose coils are on one side connected with the terminal 108 and on the other side to unit 120. All relays comprise a movable contact 124, 125, or 126. Contact 126 changes between the terminals 83 and 108 of the control device 84. Contact 125 changes between a connection with the contact 126 of relay 123 and terminal 109 and is permanently connected with terminal 96. Contact 124 of relay 121 at last changes between the terminals 108 and 109. The two relays 121 and 122 operate together and together with their movable contacts 124 and 125 they form a polarity reversing switch. Relay 123 is the so-called interval relay.

The second electric motor 27 has the same external connections 72, 73, 77 and 80 as the electric motor 26. The movable contact 75 of the parking position switch 60 is now however permanently connected with an external connection 130, from which only the signal PB is switched off. The signal PF is tapped off from the external connection 76 of the electric motor 26.

The external connection 73 of electric motor 26 is permanently connected with change over contact 131 of a relay 132, while the corresponding connection of the electric motor 27 is permanently connected with change over contact 133 of a relay 134. The change over contacts 131 and 133 change over between the lead 112 and a lead 135 connected with the terminals 72 of the electric motors 26 and 27. Relays 132 and 134 each have one side connected to the interconnected cathodes of a diode 136 and a diode 137. The anode of diode 136 is connected to lead 135 whereas the anode of diode 137 is connected to lead 112. The other side of relay 134 is connected to terminal MB and the other side of relay 132 is connected to terminal MF.

As FIG. 8 shows terminals MB and MF are outputs of an electronic circuit arrangement 139, which is mainly built up by logic switching elements 140 and RS flip-flops 141. The signals PF, PB, E, V, R and W produced by the electric switches 56, 60, 53, 54, 55 and 58, which are at first cleared of contact chatter and processed further in a further electronic circuit arrangement 142. Signals from circuit 142 are interconnected with the electronic circuit arrangement 139 in such a way that under the effect of the electric potentials at the outputs MB and MF as well as at the outputs of the control device 84 the two electric motors 26 and 27 are controlled in the manner already described above to prevent a collision of the two windshield wipers 21 and 22. The input POR of the circuit arrangement 139 receives an initialization signal to put the RS flip-flops into defined conditions when the supply voltage is switched on. Terminals V19 and V20 are connected to the control device 84 of FIG. 7 and receive signals which serve to recognize when the operating switch is again switched on during the wiping cycle in which after switching-off of the operating switch the windshield wipers are to be brought into the parking position with reversed directions of rotation of the electric motors. In this case the direction of rotation of the electric motors is changed again immediately.

The mode of operation of the circuit arrangement shown in FIG. 7 in connection with the signals MB and MF produced by the circuit arrangement according to FIG. 8 is described below, wherein it has been assumed that the two windshield wipers 21 and 22 are located in the submerged parking position and the various switches occupy the switching positions shown in FIG. 7. The two electric motors 26 and 27 are then short-circuited, because the terminals 73 are connected with the terminals 72 via the two-way switches 131 and 133 and via the lead 135. All relays are de-energized.

If now the operating switch 65 is brought into the continuous operation position positive potential is conducted to the terminal 72 of the motors 26 and 27 and to the terminal 97 of the control device 84 via the bridging contact 107, which is connected with the terminal 79 of the ignition switch applied to positive potential. Positive potential at the terminal 97 means that independently of the switching position of the parking position switch 56 at first none of the relays of the control device can be energized. When the operating switch 65 is switched on the relay 132 is energized, because terminal MF is connected to ground and positive potential appears at the other side of the relay 132 via the led 135 and the diode 136. The relay 134 continues to be de-energized, because terminal MB has positive potential. Terminal 73 of motor 26 is thus connected to ground via the changeover contact 131 of the relay 132, the lead 112 and the contact 124 of the relay 121. The motor starts in the direction of arrow D of FIGS. 3 and 6 and moves the windshield wiper 21 out of the parking position and then between the inner and outer reversing position across the window pane of a motor vehicle. The movable contact of the parking position switch 56 changes over from the terminal 80 to the terminal 77 shortly after having left the parking position without thereby affecting the motor 26. Switch 56 is always changed over to terminal 80 reversing position of the wiper for a short time. When the windshield wiper 21 has crossed position E, circuit arrangement 139 provides ground potential at terminal MB and relay 134 becomes energized. Motor 27 also begins to run and moves the windshield wiper 22 across the window pane with a higher speed. Under normal outside conditions and proper operation of motors and gearings, the relay 132 remains permanently excited, so that the motor 26 is continuously switched on. When the windshield wiper 22 reaches the inner reversing position, relay 134 is de-energized, because a signal of the parking position switch 60 evaluated in the electronic circuit arrangement 139 has the result that terminal MB changes to positive potential. Relay 134 is only energized again, when the windshield wiper 21 in the forward motion of its next wiping cycle crosses the position E.

If during a wiping cycle by the signals released by the switches 53, 54, 55, 56, 58, and 60 it is found out that there is risk of a collision for the two windshield wipers, one or the other of the two relays 132 and 134 is de-energized until the respective other windshield wiper crosses the position which again unblocks part of the wiping area for the first windshield wiper.

If now, in order to switch off the windshield wiper system, operating switch 65 is again brought into the position shown, terminals 72 of the electric motors 26 and 27 remain on positive potential via the bridging contact 106 of the operating switch 65, the control device 84 and the parking position switch 56, because during normal wiper operation the movable contact 75 of the parking position switch 56 is connected to positive potential as long as the windshield wiper 21 does not occupy its reversing position adjacent to the parking position. Because motor 27 reaches the parking position earlier than the motor 26, the motor 27 can be also supplied with current via the parking position switch 56 of the electric motor 26.

If windshield wiper 21 now reaches its inner reversing position adjacent to the parking position, then the movable contact 75 of the parking position switch 56 and the terminal 83 of the control device 84 change to negative potential. Thereby a short-circuit is closed for the electric motor 26 via the bridging contact 106 of operating switch 65. Relay 132 is de-energized. Relays 121 and 122 are energized. This does not change the potential at terminal 72 of the motors 26 and 27. The change of the contact 125 of the relay 122 is however necessary, to hold terminal 72 at negative potential when contact 75 of the parking position switch 56 after having left the inner reversing position is again connected to positive potential. Positive potential is now conducted to one side of the relays 132 and 134 via the diode 137, the lead 112 and the movable contact 124 of the relay 121 from the terminal 79. Thus they can be controlled by the signals at terminals MB and MF in just the same way as previously.

Relay 132 is therefore energized and connects terminal 73 of the electric motor 26 with the lead 112, which is applied to positive potential. Thus the polarity of the motor 26 is reversed and, starting from the inner reversing position of the windshield wiper 21, it rotates in the opposite direction to arrow D of FIGS. 3 and 6. When the windshield wiper 21 moves across position E of FIG. 1 the relay 134 becomes energized, so that also the motor 27 begins to rotate in a direction opposite to the normal direction of rotation. In the parking position of windshield wiper 22 electric motor 27 is short-circuited by de-energization of the relay 134. Motor 26 runs until, in the submerged parking position of the windshield wiper 21, contact 75 of the parking position switch 56 again changes over from terminal 77 to terminal 80. Ground potential is conducted into the control device 84 via terminal 83, so that both relays 121 and 122 are de-energized and thereby cause de-energization of relay 132 and short-circuit the motor 26.

If the operating switch 65 is brought into the intermittent operation position, lead 112 remains connected to ground via contact 124 of relay 121. Relay 123 becomes energized, so that terminal 73 of electric motors 26 and 27 are connected with terminal 79 of the ignition switch via bridging contact 106 of operating switch 65, contact 125 of relay 122 and contact 126 of relay 123. Thus the motors can start in the direction of arrow D. At the inner reversing position, after one wiping cycle contact 75 of the parking position switch 56, which was connected with terminal 77, again hits terminal 80. Relay 123 becomes de-energized for a predetermined time interval, and short-circuits the motor 26. After the time interval relay 123 becomes energized again, relay 123 is de-energized at the inner reversing position of the windshield wiper 21 again after one wiping cycle. If then at any time the operating switch is again brought into the position shown for switching-off the intermittent operation of the windshield wiper system, the polarities of the motors are reversed in the inner reversing position, then they rotate in the opposite direction during one wiping cycle and deposit the windshield wiper in the submerged parking position.

Figure 10:
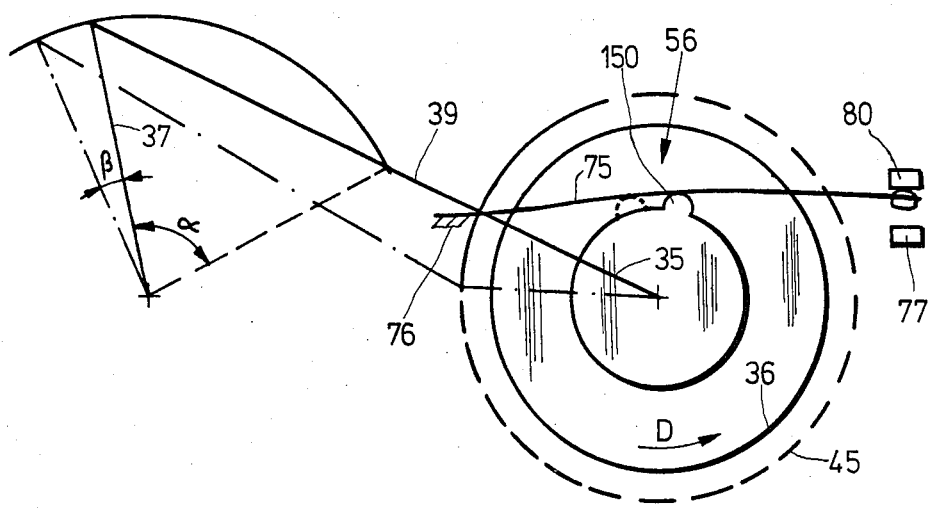
FIG. 10 is a drive unit for a windshield wiper of a second example, in which the submerged parking position the motor crank occupies a different position from the reversing position adjacent to the parking position.
Figure 11:
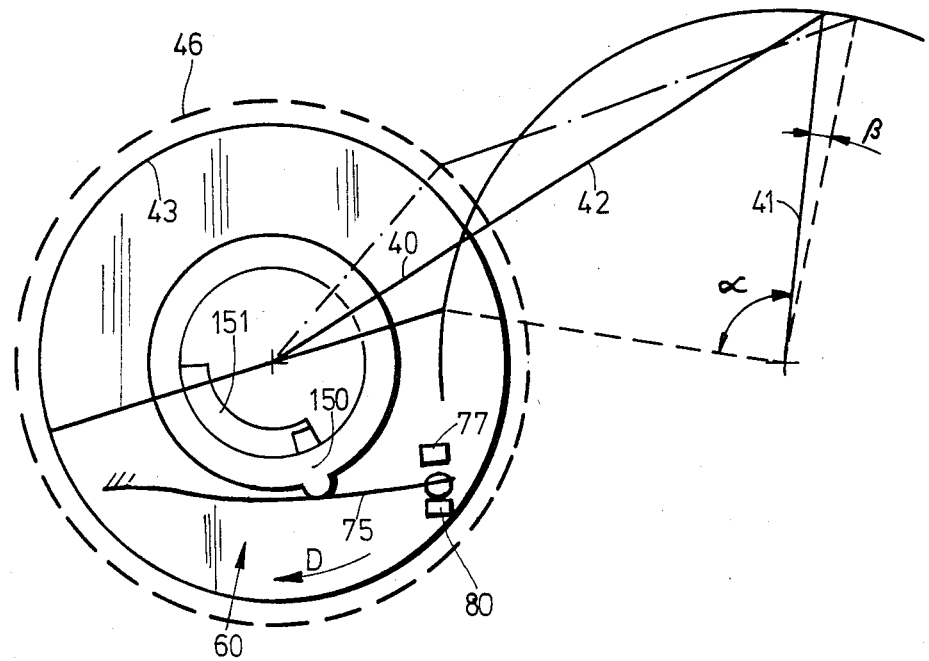
FIG. 11 is the second drive unit of the second embodiment.

In FIGS. 10 and 11 two gearings for a double wiper system are schematically shown. These gearings include a particular modification with regard to the parking position switches 56 and 60. An embodiment of this kind is particularly of advantage, when the windshield wiper 22 is not started in dependence on a particular position of the windshield wiper 21, but rather a fixed delay time is given, and when the two windshield wipers lie very closely beside each other in the parking position.

In the embodiment according to FIG. 10 again a motor crank 35, a coupling rod 39 and a rocker arm 37 are driven by the output shaft of a motor. Parking position switch 56 has movable contact 75 formed as a leaf spring, which contact changes over between the two stationary contacts 77 and 80 and can be pressed against the contact 80 from the contact 77 by a cam 150 rotating with the crank 35. In FIG. 10 the position of the crank-rocker mechanism and the condition of the parking position switch 56 are shown with unbroken lines in the inner reversing position of the windshield wiper 21. To bring windshield wiper 21 into the parking position, the motor crank 35 rotates opposite to the direction of arrow D during the next wiping cycle. In such a direction of rotation the cam 150 lifts the leaf spring 75 from the contact 77 even before it reaches the position shown in FIG. 10 and presses it against the contact 80. The electric motor is therefore switched off, when the crank 35 occupies the position shown by a dash-dotted line. Seen in the opposite direction of arrow D, this position is located in front of the position which the crank occupies upon rotation in direction of arrow D in the inner reversing position of the driven windshield wiper. The other position of the crank 35 in the submerged parking position has the effect that, when the windshield wiper system is switched on and the crank rotates in the direction of arrow D, rocker arm 37 and thus of the windshield wiper 21 rapidly reaches a high speed.

In the gearing according to FIG. 11, which is provided for driving windshield wiper 22, the parking position switch 60 is formed in such a way that, seen in the opposite direction of arrow D, in the parking position of windshield wiper 22 the crank 40 lies behind the position it occupies in a direction of rotation of arrow D in the inner reversing position of windshield wiper 22. The latter position is again shown by unbroken lines, the first position by dash-dotted lines. So that crank 40 can reach the position shown by dash-dotted lines in the parking position. The parking position, switch 60 has its cam 150 coupled with the output shaft of the motors or with the crank 40 via a dead travel 151. This is why in a reversal of the direction of rotation the leaf spring 75 is adjusted at a later time.

We claim:

1. A windshield wiper system comprising:
   a first windshield wiper;
   a first motor for driving said first wiper to and fro between a first inner reversing position and a first outer reversing position;
   a second windshield wiper;
   a second motor for driving said second wiper to and fro between a second inner reversing position and a second outer reversing position;
   said first and second inner reversing positions being adjacent each other;
   said first and second motors driving said first and second wipers in opposite angular directions;
   said first and second windshield wipers both traversing a common wiping area;
   said first windshield wiper being driven by said first motor at a greater angular velocity than said second windshield wiper is driven by said second motor; and wherein
   said first windshield wiper is stopped at said first inner reversing position for a predetermined time interval between each two wiping cycles.

2. A windshield wiper system in accordance with claim 1, further comprising:
   a first sensor actuated by said second windshield wiper reaching a first position in its forward motion, whereby said first motor is started to drive said first windshield wiper.

3. A windshield wiper system in accordance with claim 2, further comprising:
   a second sensor actuated by said second windshield wiper reaching a second position lying outside said common wiping area; and wherein
   said first motor is controlled in dependence on the position of said second windshield wiper such that said first windshield wiper only wipes a portion of said common wiping area when said second wiper crosses said second position while moving in a forward direction.

4. A windshield wiper system in accordance with claim 2, wherein:
   said first position lies within said common wiping area.

5. A windshield wiper system in accordance with claim 3, wherein:
   said first position lies within said common wiping area.

6. A windshield wiper system in accordance with claim 5, further comprising:
   a third sensor actuated by said first windshield wiper reaching a third position within said common wiping area and lying outside said first inner reversing position;
   said first motor being switched off when said first wiper reaches said third position prior to said second wiper reaching said second position in its forward motion.

7. A windshield wiper system in accordance with claim 6, wherein:
   said first motor is switched back on when said second wiper reaches said second position in its forward motion.

8. A windshield wiper system in accordance with claim 7, further comprising:
   a fourth sensor activated by said second windshield wiper reaching a fourth position outside said common area;
   said second motor being switched off when said second windshield wiper reaches said fourth position in its return motion prior to said first windshield wiper reaching said third position in its return motion.

9. A windshield wiper system in accordance with claim 8, wherein:

said fourth position is located further away from said common wiping area than said second position.

10. A windshield wiper system in accordance with claim 1, further comprising:
means coupling one of said windshield wipers to its respective one motor such that uniform rotation of said motor is converted into motion of said one wiper which is non-uniform in such a way that the duration of forward motion and return motion differs.

11. A windshield wiper system in accordance with claim 10, wherein said one windshield wiper is said first windshield wiper; and
forward motion of said first windshield wiper is slower than its return motion.

12. A windshield wiper system in accordance with claim 10, wherein said one windshield wiper is said second windshield wiper; and
the forward motion of said second windshield wiper is faster than its return motion.

13. A windshield wiper system in accordance with claim 10, wherein:
said one windshield wiper includes a wiper shaft; and further comprising
a crossed crank-rocker mechanism including a motor crank driven by said one motor, a rocker arm mounted on said wiper shaft, and a coupling rod coupling said motor crank and said rocker arm, said motor crank having an axis spaced from a straight line defined by two reversing positions of the axis of the joint between said coupling rod and said rocker arm.

14. A windshield wiper system in accordance with claim 1, wherein:
each of said first and second windshield wipers may be moved to a parking position below their respective inner reversing positions, the angle of deposit below the inner reversing position of one of said windshield wipers being greater than the angle of deposit below the inner reversing position of the other of said windshield wipers.

15. A windshield wiper system in accordance with claim 14, further comprising:
a first motor crank coupling said first motor and said first windshield wiper;
a second motor crank coupling said second motor and said second windshield wiper;
said first and second motor cranks occupying first positions when the respective wipers are in their respective inner reversing positions and occupying second positions when the respective wipers are in their respective parking positions.

16. A windshield wiper system in accordance with claim 15, wherein:
the direction of rotation of one of said motors is reversed at its inner reversing position to deposit its respective windshield wiper in its parking position.

17. A windshield wiper system in accordance with claim 16, further comprising:
a crank coupled to said one motor, a coupling rod coupled to said respective windshield wiper and a joint coupling said crank and said coupling rod, said joint including an eccentric operable such that during motion of said one motor in the reverse direction, the effective lengths of said crank and coupling rod are variable.

18. A windshield wiper system in accordance with claim 17, further comprising:
a fifth sensor actuable when one of said windshield wipers is at its respective inner reversing position; and
a sixth sensor actuable when said one windshield wiper is at its parking position.

19. A windshield wiper system in accordance with claim 17, further comprising:
a fifth sensor actuable in dependence on the direction of rotation of one of said motors such that when said one motor is rotating in a first direction said fifth sensor is actuated when the respective wiper is in its inner reversing position and when said one motor is rotating in a second direction said fifth sensor is actuated when said respective wiper is in its parking position.

20. A windshield wiper system in accordance with claim 19, wherein said fifth sensor is a parking position switch operable to couple both said first and second motors to battery when an operating switch is switched off until said one windshield wiper reaches its parking position.

21. A windshield wiper system in accordance with claim 1, further comprising:
switch means operable in dependence on the relative positions of said first and second windshield wipers such that when said first and second motors are in one relative position, said switch means provides an electrodynamic braking paths across both of said motors, and further operable to connect said first and second motors to a voltage source.

22. A windshield wiper system in accordance with claim 21, wherein:
said switch means comprises first and second relays.

23. A windshield wiper system in accordance with claim 22, further comprises:
a first diode connecting one terminal of said first motor and one terminal of said second motor to a circuit node;
said circuit node being connected to the coils of said first and second relay; and
a second diode coupled at one end to said circuit node and coupled at its other end to the other terminals of said first and second motors via switch contacts of said first and second relays.

* * * * *